Jan. 13, 1970    M. L. RANKIN, JR    3,489,366
REEL FOR FISHING ROD
Filed Oct. 17, 1966
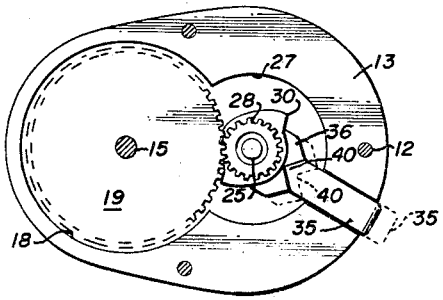
FIG. 2.
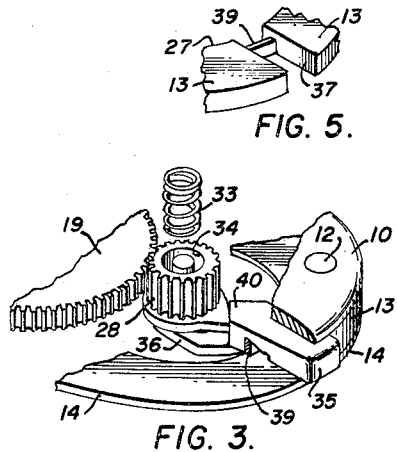
FIG. 5.
FIG. 3.
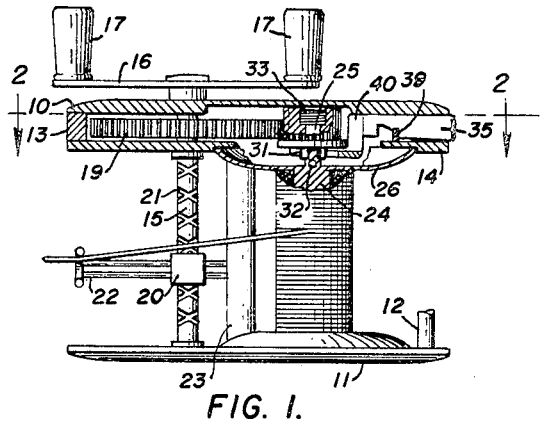
FIG. 1.
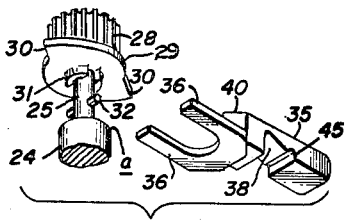
FIG. 4.
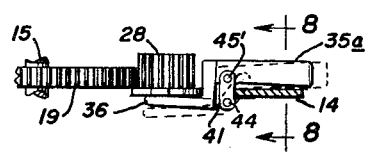
FIG. 7.
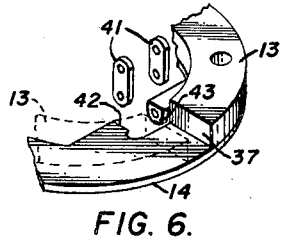
FIG. 6.
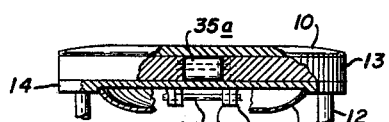
FIG. 8.
MARVIN L. RANKIN, JR.
INVENTOR.
BY *Herbert J. Brown*
ATTORNEY United States Patent Office 3,489,366
Patented Jan. 13, 1970

3,489,366
REEL FOR FISHING ROD
Marvin L. Rankin, Jr., Fort Worth, Tex., assignor to Shakespeare Company, Kalamazoo, Mich., a corporation of Michigan
Filed Oct. 17, 1966, Ser. No. 587,176
Int. Cl. A01k 89/00
U.S. Cl. 242—84.54                     8 Claims

ABSTRACT OF THE DISCLOSURE

This fishing reel includes a manually operable, positive clutch connecting the driven pinion of the crank operated drive to the spool. A split boss on the pinion is spring biased into engagement with a transverse pin on the spool shaft but is selectively disconnected by manually shifting a push bar radially inward allowing cooperating cam means on the push bar and adjacent frame to laterally shaft the inner end of the push bar provided with a yoke engaging the pinion to shift the pinion boss from engagement with the pin. Subsequent rotation of the crank drive enables cam means on the pinion to engage a follower on the push bar to shift same to its initial position. Alternatively, the lateral shifting of the push bar can be achieved by suitable toggle linkage connected between the frame and push bar.

---

This invention relates to fishing reels and has for its primary object an improved clutch mechanism for disengaging the spool from the spool pinion when casting.

A particular object is to provide a simple and rugged construction whereby the spool may be selectively disengaged from its drive mechanism for free rotation.

A further object is to provide means whereby the spool may be re-engaged with its drive mechanism by merely turning the crank handle, as when reeling in the line.

These and other objects of the invention will become apparent from the following description and the accompanying drawing, wherein:

FIGURE 1 is a plan and broken sectional view of a fishing reel according to a preferred form of the invention.

FIGURE 2 is a sectional view taken approximately on line 2—2 of FIGURE 1. The extending position of the push rod is shown by dotted lines.

FIGURE 3 is a broken perspective and partly exploded view of the drive and clutch mechanism of the first form of the invention.

FIGURE 4 is an exploded perspective view of the clutch mechanism.

FIGURE 5 is a broken perspective view of a portion of the head ring spacer on which the cam of the clutch mechanism operates.

FIGURE 6 is a broken perspective view, shown partly in dotted lines, of part of a modified form of the invention and particularly showing a pair of toggle arms which take the place of the cam in the first form of the invention.

FIGURE 7 is a side elevational and sectional view of the second form of the invention, and FIGURE 8 is a broken sectional and elevational view of the head plate assembly taken approximately along line 8—8 of FIGURE 7.

The reel shown in FIGURE 1 includes a head plate 10 and a tail plate 11, both of oval contour and spaced by pillars 12. Inwardly of the head plate 10 there is a spacer 13, and inwardly of the spacer there is a head ring 14, all of the same configuration. A first shaft 15 extends through the head plate 10, spacer ring 13, head ring 14 and its inner end is journaled in the tail plate 11. The shaft 15 extends outwardly of the head plate 10 where it is provided with a crank 16 and handles 17. As best shown in FIGURE 2, the spacer 13 has a circular opening 18 to receive a gear 19 mounted on the shaft 15. A conventional level wind is shown in FIGURE 1 and includes a carriage 20 which operates on and engages reversed threads 21 in the shaft 15, and a line guide 22, the inner end of which slides in a split pillar. Any suitable means, not shown, may be provided for mounting the reel on a casting rod.

As best shown in FIGURE 1, the spool of the reel is comprised of a spool shaft 24, the ends 25 of which are of reduced diameter and are journalled in the tail plate 11 and head plate 10. At the ends of the large portion of the shaft 24 there are cupped flanges 26, the peripheries of which are slightly spaced from the head plate 10 and the tail plate 11.

As best shown in FIGURE 2, there is another circular opening 27 in the spacer 13 intersecting the first circular opening 18 for receiving a pinion 28 which meshes with the gear 19. The pinion 28 is slidably mounted on the small diameter 25 of the shaft 24 adjacent the head plate 10 and has a circular plate 29 fixedly mounted on its inner face. Although the pinion 28 is slidably mounted it meshes with the gear 19 at all times. Laterally projecting pointed dogs 30 on opposite sides of the plate 29 have to do with disengaging the clutch mechanism, of which the plate, dogs and pinion are parts. On the inner face of the plate 29, and around the small diameter shaft 25, there is a split boss 31 providing stops which engage a transverse pin 32 in said shaft. The last referred to engagement is normally maintained by a coil spring 33 received in a recess 34 in the pinion 28 around the shaft 25 and bearing against the head plate 10.

In the first form of the invention, the boss 31 is disengaged from the transverse pin 32 by a push bar and yoke 36 as best shown in FIGURE 4. The yoke 36 is of a size to straddle the small diameter 25 of the shaft 24 and engage the shoulder *a* of the latter. Also, the size of the second circular opening 27 in the spacer 13 is such that limited movement of the yoke 36 is permitted. As best shown in FIGURE 5, the spacer 13 is slotted, at 37, from the second opening 27 to the edge of the spacer to receive the push bar 35. There is an inclined surface or cam 38 in the length of the bar 35 on the inner surface thereof which slides on a transverse bar or lift 39 in the inner end of the slot 37 and near the inner surface of the spacer 13. As shown in FIGURES 1 and 3, the yoke 36 is offset with reference to the length of push bar 36, and as best shown in FIGURES 2 and 3, the inner end of the push bar is wedge shaped to provide a second cam 40 to be contacted by the dogs 30 and thereby move the push bar outwardly.

The form of the invention illustrated in FIGURES 6–8 is like the first, except that the yoke 36 is moved outwardly by a pair of toggle arms 41. The head ring 14 is notched, at 42, at the inner end of the slot 37 and on the opposing sides of the notch there are projecting ears 43. A hinge pin 44 extends through the ears 43 and corresponding ends of the arms 41 whereas the remaining ends of the arms are pivotally connected with opposite sides of the push bar 35a by another pin 45' positioned therethrough. The push bar 35a has a different reference numeral from the first described push bar 35 because the cam surface 38 is eliminated and the inner surface is sloped to permit the yoke to move and disengage the boss 31 from the pin 32 in the small diameter 25 of the shaft 24.

The operation of the first described form of the invention is as follows:

When casting or just prior to casting, the extending end of the push bar 35 is pressed in, and by reason of the action of the cam 38, the yoke 36 moves the plate 29 and pinion 28 and disengages the boss 31 and the pin 32. This action compresses the coil spring 33. By reason of a shoulder 45 at the outer end of the cam 38, when the push bar 35 is pressed in, the shoulder rests on the transverse bar 39 in the slot 37 and thereby holds the boss 31 and pin 32 apart. Thus, the spool of the reel rotates freely until the crank 16 is turned, which action causes one of the dogs 30 to contact the second cam 40 and move the push bar 35 outwardly. Movement of the cam 38 allows the spring 33 to move the pinion 28 and cause the boss 31 to again re-engage the pin 32.

The operation of the second form of the invention is substantially like the foregoing except the toggle arms 41 take the place of the first cam 38 and adjacent shoulder 45. Pressing the push bar 35a in causes the yoke 36 to move in the same manner as described in connection with the first form of the invention with the same results. When the arms 41 are perpendicular to the head ring 14, or slightly beyond, the boss 31 and pin 32 are held apart. However, and as before, rotation of the crank 16 moves the push bar 35a outwardly and the boss 31 and pin 32 are re-engaged.

The invention is not limited to the exemplary constructions herein shown and described, but may be made in various ways within the scope of the appended claims.

What is claimed is:

1. In a reel having a spool, a shaft turnable with said spool and extending from an end thereof, a pinion around said shaft and means driving said pinion, the construction wherein said pinion is slidable on said shaft, spring means urging said pinion toward said spool, mating means on said pinion and said shaft for engagement of one by the other when said pinion is in its position toward said spool, a push bar slidably mounted perpendicular to the axis of said shaft, means on the inner end of said push bar contacting said pinion outwardly of said mating means, means for laterally moving said push bar and said pinion means in a direction to disengage said mating means when said push bar is pushed inwardly, comprising at least one toggle arm pivotally connected at one end with said push bar intermediate its ends and at its other end with said reel at a point spaced from and generally perpendicular to the length of said push bar, and means on said pinion positioned to engage an inner portion of said push bar when the latter is in its inward position.

2. In a reel having a spool, a shaft turnable with said spool and extending from an end thereof, a pinion around said shaft and means driving said pinion, the construction wherein said pinion is slidable on said shaft, spring means urging said pinion toward said spool, mating means on said pinion and said shaft for engagement of one by the other when said pinion is in its position toward said spool, a push bar slidably mounted perpendicular to the axis of said shaft, means on the inner end of said push bar contacting said pinion outwardly of said mating means, means for laterally moving said push bar and said pinion means in a direction to disengage said mating means when said push bar is pushed inwardly, comprising a cam surface on the side thereof toward said spool and a transverse bar carried by said reel positioned for coaction with said cam surface, a shoulder in said push bar outwardly of said cam surface and positioned for contact with said transverse bar, and means on said pinion positioned to engage an inner portion of said push bar when the latter is in its inward position.

3. In a reel having a spool, a shaft turnable with said spool and extending from an end thereof, a pinion around said shaft and means driving said pinion, the construction wherein said pinion is slidable on said shaft, spring means urging said pinion toward said spool, mating means on said pinion and said shaft for engagement of one by the other when said pinion is in its position toward said spool, a push bar slidably mounted perpendicular to the axis of said shaft, means on the inner end of said push bar contacting said pinion outwardly of said mating means, means for laterally moving said push bar and said pinion means in a direction to disengage said mating means when said push bar is pushed inwardly, comprising at least one toggle arm pivotally connected at one end with said push bar intermediate its ends and at its other end with said reel at a point spaced from and generally perpendicular to the length of said push bar, the throw of said toggle arm being inwardly to at least a line perpendicular to the length of said push bar and through its pivotal connection, and means on said pinion positioned to engage an inner portion of said push bar when the latter is in its inward position.

4. In a reel as defined in claim 2, the construction wherein said mating means comprises at least one stop carried by said pinion inwardly of the periphery thereof, and a projection on said shaft, said stop and said projection being positioned to engage each other when said pinion is in its position toward said spool.

5. In a reel as defined in claim 2, the construction wherein the means on the pinion positioned to engage an inner portion of said push bar when the latter is in its inward position is a dog and wherein said dog has means for disengagement with the inner portion of said push bar upon rotation of said driving means by pushing said push bar outwardly and off of said shoulder.

6. Any reel structure as described in claim 2, wherein the inner portion of said push bar comprises a second cam surface facing said pinion.

7. Any reel structure as described in claim 2, the said cam surface on the side of said push bar toward said spool being inclined outwardly from said spool toward said pinion, and a second shoulder in said push bar inwardly of said cam surface for contact with said transverse bar in the outer position.

8. Any reel structure as described in claim 2, wherein the inner portion of said push bar is angular, having engaging surfaces perpendicular to the longitudinal plane of said push bar.

References Cited

UNITED STATES PATENTS

| | | | |
|---|---|---|---|
| 2,130,581 | 9/1938 | Case | 242—84.54 |
| 2,198,257 | 4/1940 | McMahon | 242—84.54 |
| 2,547,330 | 4/1951 | Lauterbach | 242—84.54 |

BILLY S. TAYLOR, Primary Examiner